(12) United States Patent
Crews

(10) Patent No.: US 9,018,143 B2
(45) Date of Patent: Apr. 28, 2015

(54) METALLIC PARTICLE ACTIVATED OXIDATIVE BREAKING METHOD AND SYSTEM

(75) Inventor: James B. Crews, Willis, TX (US)

(73) Assignee: Baker Hughes Incorporated, Houston, TX (US)

(*) Notice: Subject to any disclaimer, the term of this patent is extended or adjusted under 35 U.S.C. 154(b) by 241 days.

(21) Appl. No.: 13/300,541

(22) Filed: Nov. 18, 2011

(65) Prior Publication Data

US 2013/0130948 A1    May 23, 2013

(51) Int. Cl.
| | |
|---|---|
| *C09K 8/68* | (2006.01) |
| *C09K 8/72* | (2006.01) |
| *C04B 28/02* | (2006.01) |
| *C23F 11/14* | (2006.01) |
| *C23F 11/18* | (2006.01) |
| *B82Y 30/00* | (2011.01) |
| *C09K 8/88* | (2006.01) |
| *C09K 8/90* | (2006.01) |

(52) U.S. Cl.
CPC . *C09K 8/68* (2013.01); *B82Y 30/00* (2013.01); *C09K 8/88* (2013.01); *C09K 8/90* (2013.01); *C09K 2208/30* (2013.01)

(58) Field of Classification Search
USPC .................. 507/215, 211, 225, 244, 270, 271
See application file for complete search history.

(56) References Cited

U.S. PATENT DOCUMENTS

| | | | |
|---|---|---|---|
| 4,144,179 A | 3/1979 | Chatterji | |
| 4,250,044 A | 2/1981 | Hinkel | |
| 4,701,247 A | 10/1987 | Kalnins et al. | |
| 4,735,731 A | 4/1988 | Rose et al. | |
| 4,741,401 A | 5/1988 | Walles et al. | |
| 5,143,157 A | 9/1992 | Harms | |
| 5,253,711 A * | 10/1993 | Mondshine | 166/300 |
| 5,624,886 A | 4/1997 | Dawson et al. | |
| 7,879,770 B2 | 2/2011 | Lin et al. | |
| 2002/0125012 A1 | 9/2002 | Dawson et al. | |
| 2008/0176770 A1 | 7/2008 | Sanders et al. | |

OTHER PUBLICATIONS

International Search Report and Written Opinion of the International Searching Authority mailed on Apr. 1, 2013 for PCT Pat. App. No. PCT/US2012/063533 filed on Nov. 5, 2012.

* cited by examiner

*Primary Examiner* — Susannah Chung
*Assistant Examiner* — Atnaf Admasu
(74) *Attorney, Agent, or Firm* — Cantor Colburn LLP

(57) ABSTRACT

A method for breaking the viscosity of an aqueous fluid gelled with a water soluble polymer or a VES is disclosed. The method includes providing an aqueous fluid. The method also includes adding to the aqueous fluid, in any order: a water soluble polymer in an amount sufficient to form a gelled aqueous fluid having a viscosity, a water soluble oxidizing agent configured to generate free radicals and a plurality of metallic particles to produce a mixture comprising dispersed metallic particles dispersed within the gelled aqueous fluid, the metallic particles configured to dissolve in the gelled aqueous fluid and provide a reducing agent to accelerate the generation of free radicals. The method further includes dissolving the metallic particles in the gelled aqueous fluid to provide a source of at least one transition metal ion in an amount effective accelerate the generation of free radicals and reduce the viscosity.

20 Claims, 2 Drawing Sheets

METALLIC PARTICLE ACTIVATED OXIDATIVE BREAKING METHOD AND SYSTEM

BACKGROUND

Viscosity controlled wellbore fluids comprising gels, such as water soluble polymer gels and viscoelastic surfactant gels, are used for various purposes in wellbore operations, such as drilling, completion, production and sequestration or other operations, particularly during hydrocarbon recovery operations. These viscosity controlled fluids must be adapted to form high viscosity fluids for operations such as fracturing, but must also be adapted for "breaking" or reducing their viscosity for subsequent operations, such as hydrocarbon recovery operations.

Fracturing fluids are complex and must simultaneously provide high temperature stability at high pump rates and fluid shear rates that may tend to cause the fluids to degrade and prematurely settle out constituents, such as proppant, before the fracturing operation is complete. Various fracturing fluids have been developed, but most commercially used fracturing fluids are aqueous-based liquids or fluids that have either been gelled or foamed using a gelling agent. Polymeric gelling agents, such as solvatable polysaccharides that are gelled by crosslinking to increase viscosity have been used. Non-polymeric viscoelastic surfactant (VES) gelling agents have also been used. In many cases, VES materials are advantageous compared to polymer gelling agents because they employ low molecular weight surfactants rather than high molecular weight polymers and may leave less gel residue within the pores of oil producing formations, leave no filter cake on the formation face and minimal amounts of residual surfactant coating the proppant, and inherently do not create microgels or fish-eye-type polymeric masses. However, both water soluble polymer and VES systems are widely used.

Both water soluble polymer and VES materials require breaker systems for to reduce their viscosity after use. These have generally included both internal and external breaker systems, which utilize reservoir conditions for viscosity reduction (breaking) and fluid removal (clean-up) during hydrocarbon production. While useful, these breaker systems have limitations, including incomplete removal of the gelled fluids, resulting in residual formation damage (e.g., impairment of hydrocarbon production). Post-treatment clean-up fluids have been employed in an attempt to break the gelled fluid for removal, but their effectiveness has been limited, resulting in well sections with unbroken or poorly broken gelled fluid that impairs hydrocarbon production, or in production delays associated with instances where breaking and clean-up takes a long time, such as several days up to possibly months to break and then produce the VES treatment fluid from the reservoir.

Various internal breakers that are activated within the fluid, such as by downhole temperatures, have also been used with the water soluble polymer-gelled and VES-gelled fluids, and typically allow a controlled rate of gel viscosity reduction in 1 to 8 hours.

While these internal breakers are very useful, the development of additional internal breakers to provide enhanced control of the breaking of water soluble polymer-gelled and VES-gelled fluids is very desirable, particularly in view of the widespread use of these fluids in fracturing and other downhole operations.

SUMMARY

In an exemplary embodiment, a method for breaking the viscosity of an aqueous fluid gelled with a water soluble polymer or a VES is disclosed. The method includes providing an aqueous fluid. The method also includes adding to the aqueous fluid, in any order: a water soluble polymer in an amount sufficient to form a gelled aqueous fluid having a viscosity, a water soluble oxidizing agent configured to generate free radicals and a plurality of metallic particles to produce a mixture comprising dispersed metallic particles dispersed within the gelled aqueous fluid, the metallic particles configured to dissolve in the gelled aqueous fluid and provide a reducing agent to accelerate the generation of free radicals. The method further includes dissolving the metallic particles in the gelled aqueous fluid to provide a source of at least one transition metal ion in an amount effective accelerate the generation of free radicals and reduce the viscosity.

In another exemplary embodiment, a breaker system for a gelled aqueous fluid gelled comprising a water soluble polymer or a viscoelastic surfactant (VES) is disclosed. The system includes a gelled aqueous fluid comprising a water soluble polymer or a VES in an amount sufficient to form the gelled aqueous fluid. The system also includes a water soluble oxidizing agent configured to generate free radicals. The system further includes a plurality of metallic particles dispersed within the gelled aqueous fluid, the metallic particles configured to dissolve in the gelled aqueous fluid and provide a reducing agent to accelerate the generation of free radicals.

BRIEF DESCRIPTION OF THE DRAWINGS

Referring now to the drawings wherein like elements are numbered alike in the several Figures.

DETAILED DESCRIPTION

Figure 1:
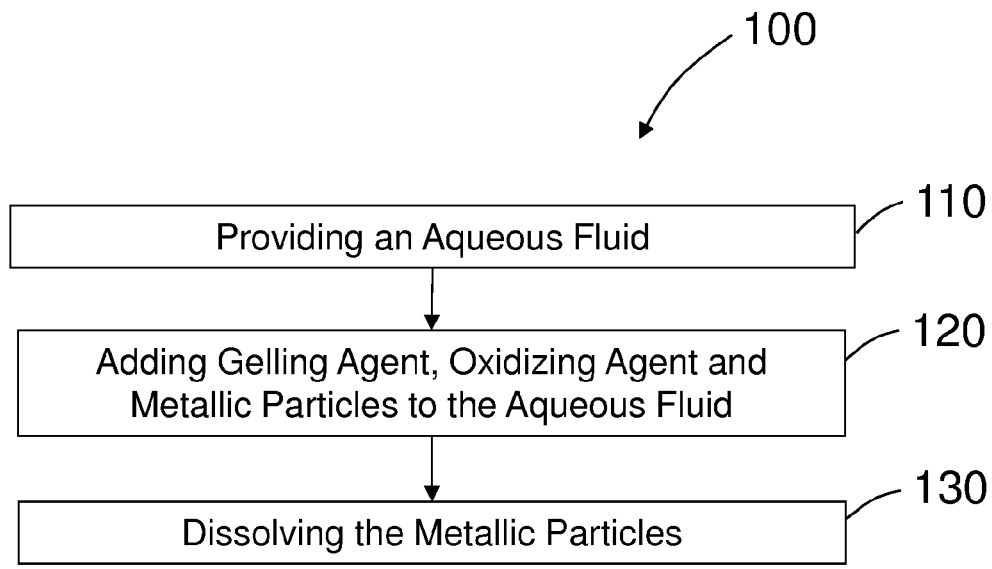
FIG. 1 is a flowchart illustrating an exemplary embodiment of a method of affecting viscosity as disclosed herein.

Referring to the Figures, and particularly FIG. 1, a method 100 for breaking the viscosity of aqueous fluids gelled with water soluble polymers or VES (i.e. surfactants that develop viscosity in aqueous brines by formation of rod-shaped or worm-shaped micellar structures) is disclosed. The method 100 may advantageously be employed to provide an internal breaker to break the viscosity of aqueous fluids gelled with water soluble polymers or VES, selectively controllable breaks, such as within about 1 to about 12 hours. The method 100 provides improved control over various aspects of the breaks, including, without limitation, the timing of breaking of the aqueous fluids gelled with water soluble polymers or VES by providing a selectively controllable breaking mechanism. The improved control may include selectively controlling the onset or initiation of breaking, the rate at which the viscosity is broken, and the extent or extensiveness of the breaking that occurs. The extent or extensiveness to which the breaking occurs may be assessed in any suitable manner, such as by measuring the volume percentage of the fluid that has its viscosity reduced, or by measuring the reduction of the viscosity that occurs during breaking, or the like. The method utilizes the dissolution of metallic particles to provide a source of transition metal ions and thereby provide a reducing agent to accelerate the generation of free radicals of a water soluble oxidizing agent in order to break the viscosity of the gelled aqueous fluid. This may enable breaking over a wider temperature range or at higher breaking rates in order to achieve enhanced viscosity break characteristics, such as nearly right angle break profiles corresponding to very high rates of change of the viscosity, including rapid increases, decreases or rapid increases followed by rapid decreases.

In an exemplary embodiment, a method 100 for breaking the viscosity of an aqueous fluid gelled with a water soluble polymer or a VES is disclosed. The method includes providing 110 an aqueous fluid. The method also includes adding 120 to the aqueous fluid, in any order: a water soluble polymer in an amount sufficient to form a gelled aqueous fluid having a viscosity, a water soluble oxidizing agent configured to generate free radicals and a plurality of metallic particles to produce a mixture comprising dispersed metallic particles dispersed within the gelled aqueous fluid, the metallic particles configured to dissolve in the gelled aqueous fluid and provide a reducing agent to accelerate the generation of free radicals. The method further includes dissolving at least a portion of 130 the metallic particles in the gelled aqueous fluid to provide a source of at least one transition metal ion in an amount effective accelerate the generation of free radicals and reduce the viscosity.

Providing 110 of an aqueous fluid may include any suitable aqueous fluid, particularly various wellbore fluids, and more particularly various well bore fluids used in well drilling, completion and production operations. In particular, providing 110 of an aqueous fluid may include various aqueous fracturing fluids. Method 100 is particularly useful for the selectively controllable reduction of the viscosity gelled aqueous fracturing fluids. Method 100 may also be used for breaking gelled water soluble polymer or VES gravel pack and loss circulation pill fluids.

The method 100 also includes adding 120 to the aqueous fluid, in any order: a water soluble polymer in an amount sufficient to form a gelled aqueous fluid having a viscosity, a water soluble oxidizing agent configured to generate free radicals and a plurality of metallic particles to produce a mixture comprising dispersed metallic particles dispersed within the gelled aqueous fluid, the metallic particles configured to dissolve in the gelled aqueous fluid and provide a reducing agent to accelerate the generation of free radicals In one embodiment, the gelling agent, including the water soluble polymer or VES, is added to the aqueous fluid to form the gelled aqueous fluid prior to the addition of the other constituents. In other embodiments, other constituents, including the metallic particles or the oxidizing agent, or both, may be added prior to adding the gelling agent. In yet another embodiment, these constituents may be added simultaneously. Adding 120 may also include various conventional mixing operations to form the gelled aqueous fluid, mix the oxidizing agent into the aqueous fluid and disperse the metallic particles forming a mixture of the constituents. In one embodiment, the mixture may be a homogeneous mixture of the constituents such that the gelled aqueous fluid is homogeneous. In another embodiment, the mixture may be a heterogeneous mixture of the constituents such that the gelled aqueous fluid is heterogeneous.

The method 100 also includes dissolving at least a portion of 130 the metallic particles in the aqueous fluid to provide a source of metal ions, particularly transition metal ions described herein, may be performed by selecting the aqueous fluid and the metallic particles such that the particles are configured for dissolution in the fluid to produce the compound comprising a metallic base. For example; the exposure of the metal particles to an aqueous fluid, such as a wellbore fluid, containing various chlorides and bromides to dissolve the particles to provide a reducing agent for reaction with the oxidizing agent and accelerate the generation of free radicals as described herein.

Broadly described, the gelled aqueous compositions of the present invention are comprised of an aqueous fluid, a water soluble polymer gelling agent or a VES gelling agent, a water soluble free radical generating agent for generating free radicals to degrade the gelling agent, and metallic particles that are configured to dissolve and provide a water soluble reducing agent for accelerating the generation of free radicals.

Suitable aqueous fluids are the aqueous wellbore fluids commonly used for treating subterranean formations. These include potable water, which is desirable for use with water soluble polymer gelling agents. However, natural brines produced from subterranean formations, synthetic completion brines and sea water are often available for treating subterranean formations and may also be used form viscous gels with the water soluble polymer or VES gelling agents. It may also be desirable to include certain salts such as potassium and sodium chloride in the gelled aqueous compositions to prevent the composition from swelling clay or damaging shale contained in subterranean formations. In other gelled aqueous compositions comprising water soluble polymers, it has been found desirable to mix the aqueous fluid with lower alkyl alcohols such as methanol, ethanol or isopropanol. The use of salts and alcohol, as well as other additives for the gelled aqueous composition, are often desirable and useful when they do not interfere with the formation of viscous gels when water soluble polymer or VES gelling agents are mixed with aqueous fluids containing these materials.

Water soluble polymer gelling agents which readily form viscous gels with aqueous fluids and which are suitable for use in accordance with the present invention are water soluble synthetic polymers, water soluble derivatives of cellulose, water soluble polysaccharides or water soluble derivatives of polysaccharides, or a combination thereof.

Examples of suitable water soluble synthetic polymers include polymethacrylamide, polyacrylamide, sodium polyacrylate, polyacrylic acid or polysodium-2-acrylamide-3-propylsulfonate, or combinations thereof. Particularly preferred polymers are polyacrylamides and polymethacrylamides which have been hydrolyzed such that from about 0 to about 70 percent of the amide groups have been converted to carboxyl groups and then neutralized with ammonium or an alkali metal hydroxide, and more particularly, polyacrylamide polymers which have been hydrolyzed such that about 0 to 30 percent of the amide groups have been converted to carboxyl groups and the carboxyl groups neutralized with an alkali metal or ammonium hydroxide.

Water soluble derivatives of cellulose suitable for use as gelling agents in accordance with the present invention include hydroxyethylcellulose, carboxymethylhydroxyethylcellulose, carboxymethylcellulose, methylcellulose, ethylcellulose, propylcellulose or sulfopropylcellulose, or a combination thereof. Water-soluble cellulose ethers may also be used, including, among others, the various carboxyalkyl celluloses ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like.

Suitable water soluble polysaccharides include xanthan gum, gum arabic, gum ghatti, gum karaya, tamarind gum, guar gum, locust bean gum or gum tragacanth, or a combination thereof. Water soluble derivatives of these polysaccharide compounds can also be utilized as gelling agents, including hydroxyethyl guar gum, hydroxypropyl guar gum or carboxymethyl guar gum, or a combination thereof. Of the various polysaccharides which can be used, guar gum is particularly suitable.

The preferred water soluble polymer gelling agents mentioned are readily commercially available and form stable gels of desired viscosity when added to aqueous fluids at relatively low concentrations, including gelling agent concentrations of about 10 to about 100 pounds per 1000 gallons of fluid. In one embodiment, a preferred concentration is about 20 to about 60 pounds per 1000 gallons of fluid.

The aqueous fluid may include a crosslinking agent to further enhance the development of viscosity by crosslinking the water soluble polymer gelling agent in the fluid. The crosslinking agent may include a borate releasing compound or any of the well known transition metal ions which are capable of creating a crosslinked structure with the particular gelling agent utilized. Examples of such crosslinking agents sources include a borate releasing compound such as sodium tetraborate, aluminum, zirconium or titanium chelates, antimony compounds and the like. The crosslinking agent may react with the water soluble polymer gelling agent to create an immediate crosslink or the crosslinking agent may be of the delayed type whereby the onset of the crosslinking can be controlled to permit introduction of the fluid into a wellbore before the viscosity significantly increases.

The aqueous fluid and water soluble polymer also may include any of the other conventional additives such as proppant solids, pH control agents, bactericides, clay stabilizers, surfactants and the like which do not adversely react with the other constituents to inhibit performance of the desired treatment upon a subterranean formation.

Any suitable VES may be used, including any of the VES systems that are familiar to those in the well service industry, and may include amines, amine salts, quaternary ammonium salts, amidoamine oxides or amine oxides, or mixtures thereof and the like, or a combination thereof. Suitable amines, amine salts, quaternary ammonium salts, amidoamine oxides, and other surfactants are described in U.S. Pat. Nos. 5,964,295; 5,979,555; and 6,239,183, which are incorporated herein by reference in their entirety.

VES systems improve the fracturing (frac) fluid performance through the use of a polymer-free system. These systems offer improved viscosity breaking, higher sand transport capability, are more easily recovered after treatment, and are relatively non-damaging to the reservoir. In some instances, the VES systems are also more easily mixed "on the fly" in field operations.

The VES suitable for use include various non-ionic, cationic, amphoteric or zwitterionic surfactants, or a combination thereof. Specific examples of zwitterionic/amphoteric surfactants include dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid or salicylic acid, or their salts, or a combination thereof.

Some non-ionic fluids are inherently less damaging to the producing formations than cationic fluid types, and are more efficacious per pound than anionic gelling agents. Amine oxide viscoelastic surfactants have the potential to offer more gelling power per pound, making them less expensive than other fluids of this type. The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one embodiment, R is an alkyl or alkylamido group averaging from about 8 to 16 carbon atoms and R' are independently alkyl groups averaging from about 2 to 3 carbon atoms. In an alternate embodiment, the amidoamine oxide gelling agent is Akzo Nobel's Aromox APA-T formulation, which should be understood as a dipropylamine oxide since both R' groups are propyl.

Materials described in U.S. Pat. No. 5,964,295 include ClearFRAC™, which may also comprise greater than 10% of a glycol. One preferred VES is an amine oxide. As noted, a particularly preferred amine oxide is APA-T, sold by Baker Hughes as SurFRAQ™ VES. SurFRAQ is a VES liquid product that is about 45-55% APA-T and 35-45% propylene glycol. These VES are capable of gelling aqueous solutions to form a gelled base fluid. The additives of this invention may also be used in Diamond FRAQ™ which is a VES system, similar to SurFRAQ, sold by Baker Hughes.

The invention covers commonly known materials as Aromox APA-T manufactured by Akzo Nobel and other known VES gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step. Thus, depending on the application, the VES is added to the aqueous fluid in concentrations ranging from about 0.5 to 25% by volume, alternatively up to about 12% by volume of the total aqueous fluid (from about 5 to 120 gallons per thousand gallons (gptg)). In another embodiment, the range is from about 0.6 to about 10.0% by volume VES product of the total aqueous fluid. In yet another embodiment, the amount of VES ranges from 0.8 to about 6.0% by volume of the total aqueous fluid.

It is expected that the breaking compositions described herein can be used to reduce the viscosity of a VES-gelled aqueous fluid regardless of how the VES-gelled fluid is ultimately utilized. For example, the viscosity breaking compositions could be used in all VES applications including, VES-gelled friction reducers, VES viscosifiers for loss circulation pills, fracturing fluids, gravel pack fluids, viscosifiers used as diverters in acidizing, VES viscosifiers used to clean up drilling mud filter cake, remedial clean-up of fluids after a VES treatment (post-VES treatment), and the like.

Any suitable mixing apparatus may be used for method 100, including those used for both batch and continuous mixing. In the case of batch mixing, the water soluble polymer or VES and the aqueous fluid are blended for a period of time sufficient to form a gelled or viscosified solution.

The free radical generating agents that may be used include water soluble oxidizing agents having the property of generating free radicals for degrading the gelling agent. Such oxidizing agents include water soluble persulfates, percarbonates, perbromates, perborates, bromates, chlorites, chlorates, hypochlorites, urea peroxide, hydrogen peroxides, sodium bromide or mixtures thereof. Examples of preferred and particularly suitable water soluble peroxide compounds include, but are not limited to, hydrogen peroxide, tertiary butyl hydroperoxide and ditertiary butyl peroxide. Preferred water soluble oxidizing agents include ammonium persulfate, potassium persulfate, sodium persulfate, sodium percarbonate, sodium perbromate, sodium perborate, potassium bromate, sodium chlorite, sodium chlorate, sodium hypochlorite, urea peroxide, sodium bromide, or a combination thereof, and the like. The free radical generating agents may be utilized in an amount of about 0.0001 to about 2 parts by weight free radical generator per 100 parts by weight aqueous fluid. At a concentration below about 0.0001 part free radical generator per 100 parts aqueous fluid, the rate of degradation of the gelling agent is low and the time required for breaking the gel is generally too long. Above a concentration of about 2 parts by weight free radical generator per 100 parts by weight aqueous fluid, excess free radicals are generated and the gel breaks. When utilizing the preferred free radical generating agents mentioned above, they are combined with the aqueous fluid and gelling agent in an amount of about 0.001 to about 0.8 parts by weight free radical generator per 100 parts by weight of the total aqueous fluid.

The reducing agent may include metallic particles dispersed within the gelled aqueous fluid, particularly metallic particles that are configured to dissolve in the gelled aqueous fluid and provide a source of transition metal ions useful as reducing agent to accelerate the generation of free radicals.

The composition of the aqueous fluid includes metallic particles that may be dissolved to provide at least one metal ion source where the goal is to deliver at least one metal ion to the gelled system. The metallic particles and metal ions may be selected from metals described herein, including Group VA, VIA, VIIA, VIIIA, IB, IIB, IIIB or IVB of the Periodic Table (previous IUPAC American Group notation), or a combination thereof. These may include, for example, iron, copper, manganese, cobalt, zinc, nickel, vanadium, tin, aluminum, molybdenum, platinum, palladium, and mixtures thereof.

Any suitable metallic particles may be added to the aqueous fluid in accordance with method 100, and adding 120 may be performed in any suitable manner, including as a free-flowing powder of the metallic particles, or by premixing the metallic particles into the water soluble polymer or VES, or a combination thereof. Suitable metallic particles include those described above, which may be configured to be dissolved in the aqueous fluid to provide a source of transition metal ions, and particularly metallic cations that may provide a sufficient reducing agent to react with the oxidizing agent and generate sufficient free radicals to break the gelled aqueous fluid. The metallic particles may be configured for selectively controllable dissolution and release of their associated cations in the aqueous fluid as described herein. The metallic cations may also interact or react with other constituents that may be added to the aqueous fluid, including the other breaking constituents described herein.

The metallic particles may have any suitable size, shape, composition and morphology (i.e. they may be substantially solid or porous or comprise an agglomeration or consolidation of several particles), but will preferably be configured to provide a predetermined amount of the metallic cations and a predetermined dissolution characteristic, such as a predetermined onset of dissolution, rate of dissolution, extent of dissolution and the like. In certain embodiments, the metallic particles may comprise substantially spherical solid or porous particles. In other embodiments, the metallic particles may have non-spherical shapes, including platelets, rods or other non-spherical shapes or rod-like shapes. In yet other embodiments, the particles may include an agglomeration or consolidation of a number of smaller particles as a powder compact or other consolidated form, and may have an open structure between the agglomerated or consolidated particles to provide a high surface area analogous to a zeolite.

Figure 2:
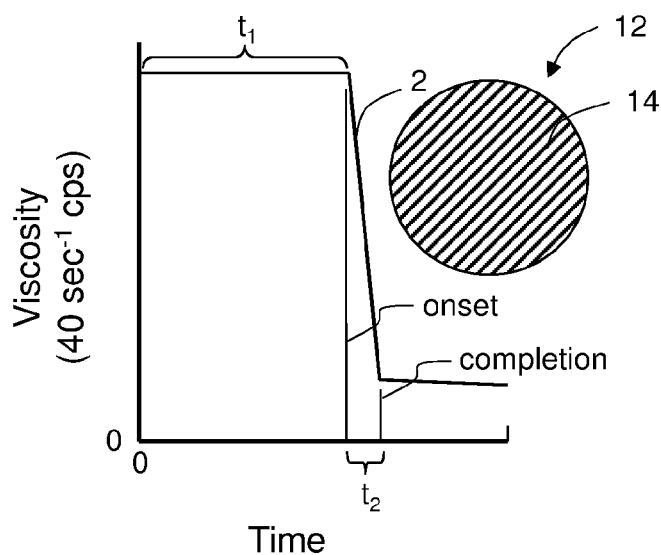
FIG. 2 is a schematic illustration of viscosity as a function of time for an exemplary embodiment of an aqueous fluid and method of affecting viscosity of the fluid as disclosed herein.
Figure 3:
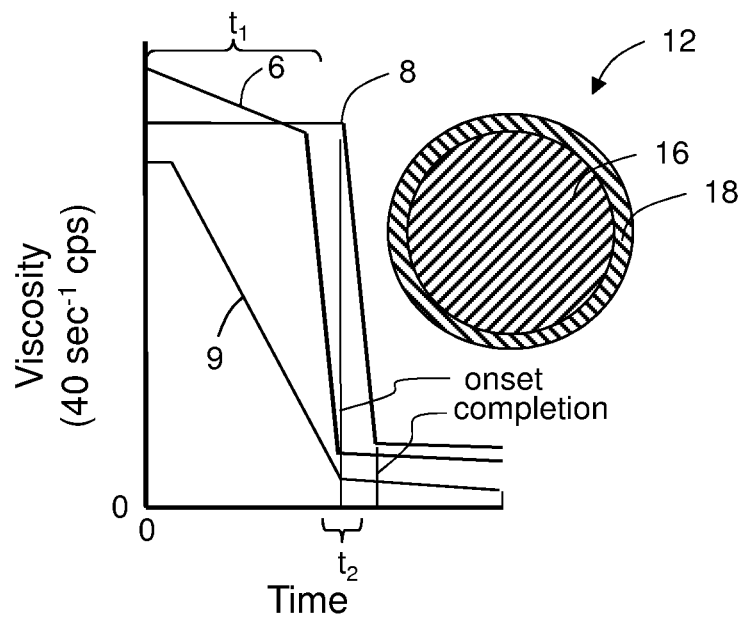
FIG. 3 is a schematic illustration of viscosity as a function of time for a second exemplary embodiment of an aqueous fluid and method of affecting viscosity of the fluid as disclosed herein.

In one embodiment, the metallic particles 12 may be uncoated metallic particles 14, such that the particles begin dissolving and affect breaking immediately upon being added to the aqueous fluid, or if encapsulated as described herein, when released into the gelled aqueous fluid to provide source of transition metal ions as a reducing agent sufficient to react with the oxidizing agent and generate sufficient free radicals to break the gelled aqueous fluid as described herein as shown schematically in FIG. 2 by curve 2. It includes an interval $t_1$ during which an encapsulant dissolves and a second interval during which the uncoated metallic particle 14 dissolves. In another embodiment, the metallic particles 12 may be coated and include a coating layer 16 and a particle core 18 as shown in FIG. 3. It includes an interval $t_1$ during which the coating layer 16 dissolves and a second interval during which the particle core 18 dissolves. The coating layer, for example, may be selected to dissolve at a selectively controllable rate to provide a working interval for use of the gelled aqueous fluid, such as in a fracturing operation, and may cause the viscosity decrease as shown in curve 6 or remain substantially the same as shown in curve 8. Upon dissolution of the coating layer 16, the particle core 14 may also be selected to provide selectively controllable dissolution by providing a reducing agent sufficient to react with the oxidizing agent and generate sufficient free radicals to cause a rapid break in the viscosity of the gelled aqueous fluid, such as a desirable right angle break or a break that occurs at a substantially right angle. All manner of coated metallic particles may be employed. The coated metallic particles described in co-pending patent applications US2011-0135953 A1 filed on Dec. 8, 2009 and U.S. Ser. Nos. 13/220,824, 13/220,832 and 13/220,822 filed on Aug. 30, 2011, and assigned to the same assignee as this application, Baker Hughes, Inc., and which are all incorporated by reference herein in their entirety, are particularly useful. These applications describe coated metallic particles having nanoscale coatings (e.g., about 50 nm to about 2500 nm) of Al, Zn, Zr, Mn, Mg, Mo, Ti, Fe, Si, Ca or Sn, or an oxide, carbide or nitride thereof, or a cermet thereof, or a combination thereof, wherein the coating layer has a chemical composition and the particle core has a chemical composition that is different than the chemical composition of the coating layer. The coating layers are formed on particle cores of core material, including those having electrolytically reactive particle core materials, including those having a standard oxidation potential greater than or equal to that of Zn, including Mg, Al, Mn, or Zn, or a combination thereof. The particle cores have average particle sizes of about 50 nm or greater. The metallic particles are particularly well-suited for selectively controllable dissolution in a wellbore fluid, such as the aqueous wellbore fluids described herein, and particularly may be configured for rapid dissolution in these fluids. In addition to the coating materials described above, in an exemplary embodiment, a coated particle having a nanoscale coating that includes Al, Zn, Zr, Mn, Mg, Mo, Ni, Ti, Fe, Cu, Co, Cr, Si, Ca or Sn, or an oxide, carbide or nitride thereof, or a combination thereof, and wherein the coating layer has a chemical composition and the particle core has a chemical composition that is different than the chemical composition of the coating layer, may be particularly desirable. In this embodiment, the particle core may include, for example, a metal selected from Group VA, VIA, VIIA, VIIIA, IB, IIB, IIIB or IVB of the Periodic Table (previous IUPAC American Group notation), or an alloy thereof, or a composite thereof, or a combination thereof. In another exemplary embodiment, the nanoscale coating layer may have thickness range of about 0.5 nm to about 2500 nm, and a range of particle core sizes, including an average particle size of about 8 nm to about 250 µm, and more particularly, an average particle size of about 10 nm to about 20 µm, and even more particularly, an average particle size of about 30 nm to about 10 µm.

The metallic particles may also be deformed to incorporate nanostructuring in the coating layers or particle cores, or both. As used herein, a nanostructured material is a material having a grain size, or a subgrain or crystallite size, less than about 200 nm, and more particularly a grain size of about 10 nm to about 200 nm, and even more particularly an average grain size less than about 100 nm. The nanostructure may include high angle boundaries, which are usually used to define the grain size, or low angle boundaries that may occur as substructure within a particular grain, which are sometimes used to define a crystallite size, or a combination thereof. The nanostructure may be formed in the metallic particle, including in the case of coated particles the particle core or the coating layer, or both, by any suitable method, including deformation-induced nanostructure such as may be provided by ball milling a powder to provide metallic particles, and more particularly by cryomilling (e.g., ball milling in ball milling media at a cryogenic temperature or in a cryogenic fluid, such as liquid nitrogen). The stored strain energy associated with nanostructuring may also be utilized to affect selectively controllable dissolution of the metal particles, particularly even dissolution rates that are higher than the dissolution rate of an identical particle that does not have a nanostructured microstructure, i.e., one having stored strain energy associated with the nanostructuring. As also shown comparatively with regard to the coated metallic particles described herein with reference to FIG. 3, in one embodiment an uncoated metallic particle 12 may be selected and configured to begin dissolution more rapidly (i.e., it has a shorter $t_1$) because it does not have a coating layer and may dissolve at a slower rate (i.e., have a longer $t_2$) than a coated particle as illustrated by curve 9.

In an exemplary embodiment, the coating layer, including its composition and size or thickness may, for example, be selected to dissolve at a predetermined rate in the aqueous fluid, and provide a first characteristic and coating working interval for the fluid, such as a coating interval corresponding to a wellbore treatment, such as a fracturing treatment. The coating layer may, for example, be selected to maintain the viscosity of the aqueous fluid at a predetermined level, such as a relatively high level, sufficient to affect a wellbore treatment, such as fracturing. The coating layer may comprise any suitable material, including a polymer, metal, cermet or ceramic, or a composite thereof, or a combination thereof. In one embodiment, the coating layer may include a water soluble or water permeable polymer. In another embodiment, the coating layer may include a metallic coating layer comprising Al, Zn, Zr, Mn, Mg, Mo, Ni, Ti, Fe, Cu, Co, Cr, Si, Ca or Sn, or an oxide, carbide or nitride thereof, or a composite thereof, or a cermet thereof, or a combination thereof. The coating layer may also include multiple layers of the materials as mentioned. In one embodiment, the coating layer may have an average thickness of about 0.5 nm to about 2500 nm. The particle core, including its composition and size, may, for example, be selected and configured to dissolve at a predetermined rate in the aqueous fluid, and provide a second characteristic and a core working interval for the fluid, such as an interval corresponding to breaking the gelled aqueous fluid. The particle core may, for example, be selected to provide a source of a transition metal ion sufficient to provide an amount of a reducing agent sufficient promote reaction with the oxidizing agent and generation of free radicals in an amount sufficient to break the gelled aqueous fluid as described herein and reduce the viscosity of the aqueous fluid to a predetermined level, such as a relatively low level, sufficient to enable removal of the aqueous fluid from the wellbore. Any suitable material may be used for the particle core, including various transition metals or transition metal alloys. In one embodiment, the particle core material may include iron, copper, manganese, cobalt, zinc, nickel, vanadium, tin, aluminum, molybdenum, platinum, palladium, or an alloy thereof, or a composite thereof, or a cermet thereof, or combination thereof. The particle core may have any suitable thickness, including those described herein.

Figure 4:
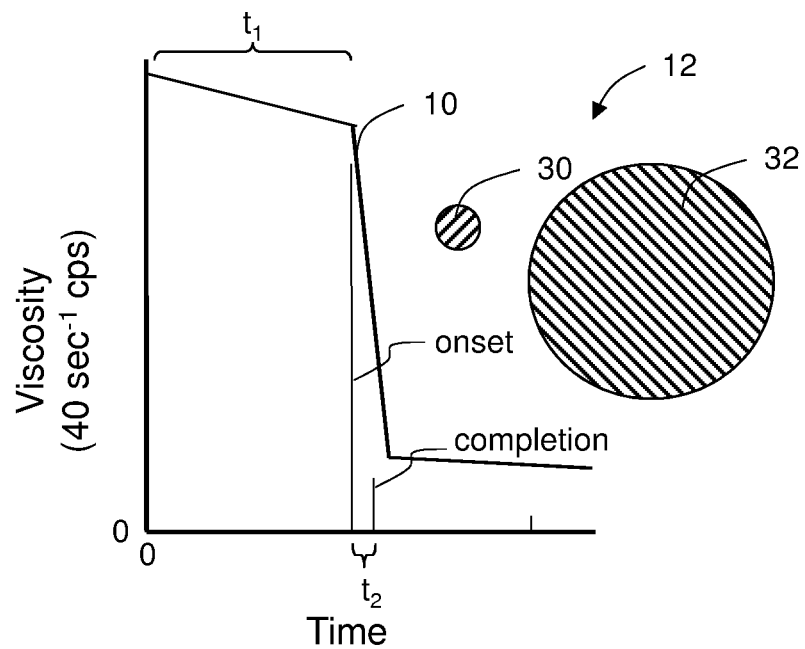
FIG. 4 is a schematic illustration of viscosity as a function of time for a third exemplary embodiment of an aqueous fluid and method of affecting viscosity of the fluid as disclosed herein.

Whether coated or uncoated, the plurality of metallic particles may be formed from one material or combination of materials, or may be formed from more than one material, or more than one combination of materials. Further, the metallic particles may have a single or unimodal average particle size or size distribution of particle sizes, or may have a plurality of average particle sizes or size distributions (multimodal average particle sizes or size distributions). Either or both of these aspects may be used to affect a variable response within the gelled aqueous fluid. For example, a plurality of small metallic particles 12 of a first metallic material 30 can be used to rapidly dissolve and release sufficient first metallic cations to cause a gradual decrease in the viscosity over a first selectively controllable time ($t_1$) interval and plurality of larger particles of a second metallic material 32 may be selected to release sufficient second metallic cations to cause a break or rapid reduction in the viscosity over a second later time interval ($t_2$) as illustrated by dissolution curve 10 in FIG. 4.

The amount of metal particles included in the treating composition, including the ions produced by dissolving the metallic particles, may range from about 0.01 to about 2,000 ppm, based on the total amount of the fluid. In another non-restrictive embodiment, the amount of metal particles may range from a lower limit of about 1 and/or to an upper limit of about 1,000 ppm.

The method 100 may be used to provide a breaker system for a gelled aqueous fluid gelled comprising a water soluble polymer or a viscoelastic surfactant (VES). The system includes a gelled aqueous fluid comprising a water soluble polymer or a VES in an amount sufficient to form the gelled aqueous fluid. The system also includes a water soluble oxidizing agent configured to generate free radicals. The system further includes a plurality of metallic particles dispersed within the gelled aqueous fluid, the metallic particles configured to dissolve in the gelled aqueous fluid and provide a reducing agent to accelerate the generation of free radicals.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method for breaking the viscosity of an aqueous fluid gelled with a water soluble polymer or a viscoelastic surfactant (VES), comprising:
    providing an aqueous fluid;
    adding to the aqueous fluid, in any order:
        a water soluble polymer or a VES in an amount sufficient to form a gelled aqueous fluid having a viscosity,
        a water soluble oxidizing agent configured to generate free radicals, and
        a coated metal particle to produce a mixture comprising a dispersed metal particle dispersed within the gelled aqueous fluid, the metal particle configured to dissolve in the gelled aqueous fluid and provide a reducing agent to accelerate the generation of free radicals, the coated metal particle comprises a metal particle core that is configured for dissolution in the aqueous fluid to provide a source of at least one transition metal ion and a metal coating layer that is configured to selectively control access of the aqueous fluid to the metal particle core, the metal coating layer having a chemical composition different from the metal particle core; and
    dissolving the metal particle in the gelled aqueous fluid to provide the source of at least one transition metal ion in an amount effective to accelerate the generation of free radicals and reduce the viscosity.

2. The method of claim 1, wherein the at least one transition metal ion is present in an amount of about 0.01 to about 2000 ppm of the gelled aqueous fluid.

3. The method of claim 1, wherein the coated metal particle comprises a transition metal selected from Group VA, VIA, VIIA, VIIIA, IB, IIB, IIIB or IVB of the Periodic Table, or an alloy thereof, or a composite thereof, or a cermet thereof, or a combination thereof.

4. The method of claim 1, wherein the particle core comprises a transition metal selected from Group VA, VIA, VIIA, VIIIA, IB, IIB, IIIB or IVB of the Periodic Table, or an alloy thereof, or a composite thereof, or a cermet thereof, or a combination thereof.

5. The method of claim 1, wherein the coating layer comprises Al, Zn, Zr, Mn, Mg, Mo, Ni, Ti, Fe, Cu, Co, Cr, Si, Ca or Sn, or an oxide, carbide or nitride thereof, or a combination thereof.

6. The method of claim 1, wherein the coating layer has an average thickness of about 0.5 nm to about 2500 nm.

7. The method of claim 1, wherein the metal particle has an average particle size of about 8 nm to about 250 μm.

8. The method of claim 1, wherein the metal particle has an average particle size of about 10 nm to about 20 μm.

9. The method of claim 1, wherein the metal particle has an average particle size of about 30 nm to about 10 μm.

10. The method of claim 1, wherein the water soluble polymer comprises a synthetic polymer, a cellulose derivative, a polysaccharide or a polysaccharide derivative, or a combination thereof.

11. The method of claim 10, wherein the polysaccharide comprises xanthan gum, guar gum, locust bean gum, gum tragacanth, hydroxyethyl guar gum, hydroxypropyl guar gum or carboxymethyl guar gum, or a combination thereof.

12. The method of claim 10, wherein the cellulose derivative comprises hydroxyethylcellulose, carboxymethylhydroxyethylcellulose, carboxymethylcellulose, methylcellulose, ethylcellulose, propylcellulose or sulfopropylcellulose, or a combination thereof.

13. The method of claim 10, wherein the synthetic polymer comprises polymethacrylamide, polyacrylamide, sodium polyacrylate, polyacrylic acid or polysodium-2-acrylamide-3-propylsulfonate, or a combination thereof.

14. The method of claim 1, wherein the VES comprises a non-ionic surfactant, cationic surfactant, amphoteric surfactant or zwitterionic surfactant, or a combination thereof.

15. The method of claim 1, wherein the VES comprises amines, amine salts, quaternary ammonium salts, amidoamine oxides or amine oxides, dihydroxyl alkyl glycinate, alkyl ampho acetate or propionate, alkyl betaine, alkyl amidopropyl betaine or alkylimino mono- or di-propionates, or a combination thereof.

16. The method of claim 1, wherein the oxidizing agent comprises a water soluble peroxide, persulfate, bromate, chlorate or chlorite, or a combination thereof.

17. The method of claim 16, wherein the oxidizing agent comprises hydrogen peroxide, tertiary butyl hydroperoxide, di-tertiary butyl peroxide, ammonium persulfate or an alkali metal persulfate, percarbonate or perbromate, perborate, bromate, chlorite, chlorate, hypochlorite, urea peroxide or sodium bromide, or a combination thereof.

18. The method of claim 1, wherein dissolving the metal particle in the gelled aqueous fluid provides a plurality of sources of transition metal ions.

19. The method of claim 1, wherein the coated metal particle comprises a plurality of coated metal particles having a multimodal distribution of average particle sizes.

20. The method of claim 1, wherein the coated metal particles comprises a nanostructured metal particles.

* * * * *